United States Patent
Jadhav (10) Patent No.: US 10,846,139 B2
(45) Date of Patent: Nov. 24, 2020

(54) SELF-PURGATIVE ELECTRONIC RESOURCES

(71) Applicant: BANK OF AMERICA CORPORATION, Charlotte, NC (US)

(72) Inventor: Shashikant Sadashiv Jadhav, Singapore (SG)

(73) Assignee: BANK OF AMERICA CORPORATION, Charlotte, NC (US)

(*) Notice: Subject to any disclaimer, the term of this patent is extended or adjusted under 35 U.S.C. 154(b) by 133 days.

(21) Appl. No.: 16/192,081

(22) Filed: Nov. 15, 2018

(65) Prior Publication Data

US 2020/0159583 A1 May 21, 2020

(51) Int. Cl.
*G06F 9/50* (2006.01)
*H04L 29/06* (2006.01)

(52) U.S. Cl.
CPC .......... *G06F 9/5016* (2013.01); *G06F 9/5022* (2013.01); *H04L 63/10* (2013.01)

(58) Field of Classification Search
None
See application file for complete search history.

(56) References Cited

U.S. PATENT DOCUMENTS

| | | |
|---|---|---|
| 6,915,435 B1 | 7/2005 | Merriam |
| 7,200,593 B2 | 4/2007 | Shimomura et al. |
| 7,249,251 B2 | 7/2007 | Todd et al. |
| 7,325,052 B1 | 1/2008 | Motoyama |
| 7,703,125 B2 | 4/2010 | Motoyama |
| 7,720,825 B2 | 5/2010 | Pelletier et al. |
| 7,739,746 B2 | 6/2010 | Donahue |
| 7,748,045 B2 | 6/2010 | Kenrich et al. |
| 8,272,028 B2 | 9/2012 | Motoyama |
| 8,413,231 B1 | 4/2013 | Donahue |
| 8,527,468 B1 | 9/2013 | Crafford et al. |
| 8,613,102 B2 | 12/2013 | Nath |
| 8,788,463 B2 | 7/2014 | Friesenhahn et al. |
| 8,943,603 B2 | 1/2015 | Simske et al. |
| 9,286,301 B2 | 3/2016 | Motoyama |
| 9,384,358 B2 | 7/2016 | Lim |

(Continued)

OTHER PUBLICATIONS

EFileCabinet Releases Advanced Document Management Workflow Module by eFileCabinet, May 31, 2012. https://www.efilecabinet.com/efilecabinet-releases-advanced-document-management-workflow-module/.

*Primary Examiner* — Syed A Roni
(74) *Attorney, Agent, or Firm* — Michael A. Springs; Moore & Van Allen PLLC; Nicholas C. Russell (57) ABSTRACT

Embodiments of the present invention provide a system for creating and managing self-purgative electronic resources. The system is configured for receiving an indication associated with creation of a first electronic resource, identifying a first purge duration associated with the first electronic resource, creating the first electronic resource with the first purge duration, wherein the first purge duration embedded into the first electronic resource as additional metadata, assigning a unique extension to the first electronic resource and store the first electronic resource in a first memory location, identifying that the first purge duration is zero, in response to identifying that the first purge duration is zero, allocating the first memory location associated with the first electronic resource in the memory for other electronic resources.

20 Claims, 6 Drawing Sheets

(56) References Cited

U.S. PATENT DOCUMENTS

| | | |
|---|---|---|
| 9,497,219 B2 | 11/2016 | Lim |
| 9,870,359 B2 | 1/2018 | Lehmann et al. |
| 9,934,255 B2 | 4/2018 | Hu et al. |
| 9,934,256 B2 | 4/2018 | Hu et al. |
| 2006/0156381 A1 | 7/2006 | Motoyama |
| 2011/0035356 A1* | 2/2011 | Vukojevic |
| 2019/0266256 A1* | 8/2019 | Dudani |

* cited by examiner

SELF-PURGATIVE ELECTRONIC RESOURCES

BACKGROUND

Current operating systems do not have capability to manage electronic resources associated with an entity effectively, thereby resulting in unnecessary consumption of memory in the systems associated with the entity. Therefore, there exists a need for a system to manage the electronic resources associated with the entity efficiently.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for creating and managing self-purgative electronic resources. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention receives an indication associated with creation of a first electronic resource, identifies a first purge duration associated with the first electronic resource, creates the first electronic resource with the first purge duration, wherein the first purge duration embedded into the first electronic resource as additional metadata, and assigns a unique extension to the first electronic resource and store the first electronic resource in a first memory location.

In some embodiments, the present invention identifies that the first purge duration is zero and in response to identifying that the first purge duration is zero, allocates the first memory location associated with the first electronic resource in the memory for other electronic resources.

In some embodiments, the present invention identifies that the first electronic resource is moved from a first memory location to a second memory location, wherein the first purge duration in a form of the additional metadata is moved with the first electronic resource, identifies that the first purge duration is zero, and in response to identifying that the first purge duration is zero, allocate the second memory location associated with the first electronic resource for other electronic resources.

In some embodiments, the present invention identifies that the first electronic resource is copied to a second memory location as a second electronic resource, wherein the first purge duration is copied to the second electronic resource, wherein the first purge duration in a form of the additional metadata is automatically embedded into the second electronic resource, wherein the second electronic resource is saved in the second memory location with the unique extension, identifies that the first purge duration is zero, and in response to identifying that the first purge duration is zero, allocates the second memory location associated with the second electronic resource in the memory for other electronic resources.

In some embodiments, the present invention receives an indication from a user to access the first electronic resource from a first computing device, displays the first electronic resource on the first computing device, and in response to displaying the first electronic resource on the first computing device, displays the first purge duration associated with the first electronic resource on the first computing device.

In some embodiments, the present invention receives an instruction to modify the first purge duration from a user and in response to receiving the instruction, modifies the first purge duration of the first electronic resource.

In some embodiments, the present invention automatically modifies the first purge duration of the first electronic resource, wherein the modifying is based on identifying that the first electronic resource has been accessed by a user.

In some embodiments, the first electronic resource is associated with an application associated with an entity, wherein the first electronic resource is automatically created by the application.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "electronic resources" may be any electronic documents comprising data associated with an entity. As used herein, the terms "entity system" or "entity" may be any financial institution including, but not limited to, commercial banks, thrifts, federal and state savings banks, savings and loan associations, credit unions, investment companies, insurance companies and the like. In some embodiments, the entity system may be any of the non-financial institutions. In some embodiments, the entity system may be any entity which utilizes, creates, and/or manages software applications. As used herein, the term "user" in some embodiments, may refer to an employee (e.g., full-time employee, part-time employee, contractor, sub-contractor or the like) of the entity.

Current operating systems assign purge policy individually to each of the electronic resources stored in specific memory locations, scan the entity systems at frequent intervals to identify electronic resources with expired purge policy, and purge such electronic resources. However, when the electronic resources are moved within the entity systems or copied to other entity systems or user computing systems, the purge policy associated with the electronic resources is not moved. As such, the electronic resources are retained in the entity systems and the user computing systems even after the expiration of the purge policy associated with the electronic resources, thereby consuming memory of the entity systems and the user computing systems. Furthermore, the operating systems associated with the entity systems and the user computing systems need to scan the entity systems and the user computing systems at frequent intervals to identify electronic resources that may have expired, which decreases the processing efficiency of the entity systems and the user computing systems. Therefore, there exists a need for a system to manage the electronic resources associated with the entity systems.

The system of the present invention overcomes the aforementioned technical problems by creating self-purgative electronic resources comprising purge duration embedded into the electronic resources as additional metadata. As a result, the purge duration is retained within an electronic resource even when the electronic resource is moved from a first memory location to a second memory location or when the electronic resource is copied to a third memory location. This allows purging of all electronic resources with expired purge policy without having to perform additional scans to detect such electronic resources, thereby freeing up memory and improving the processing efficiency of the system.

Figure 1:
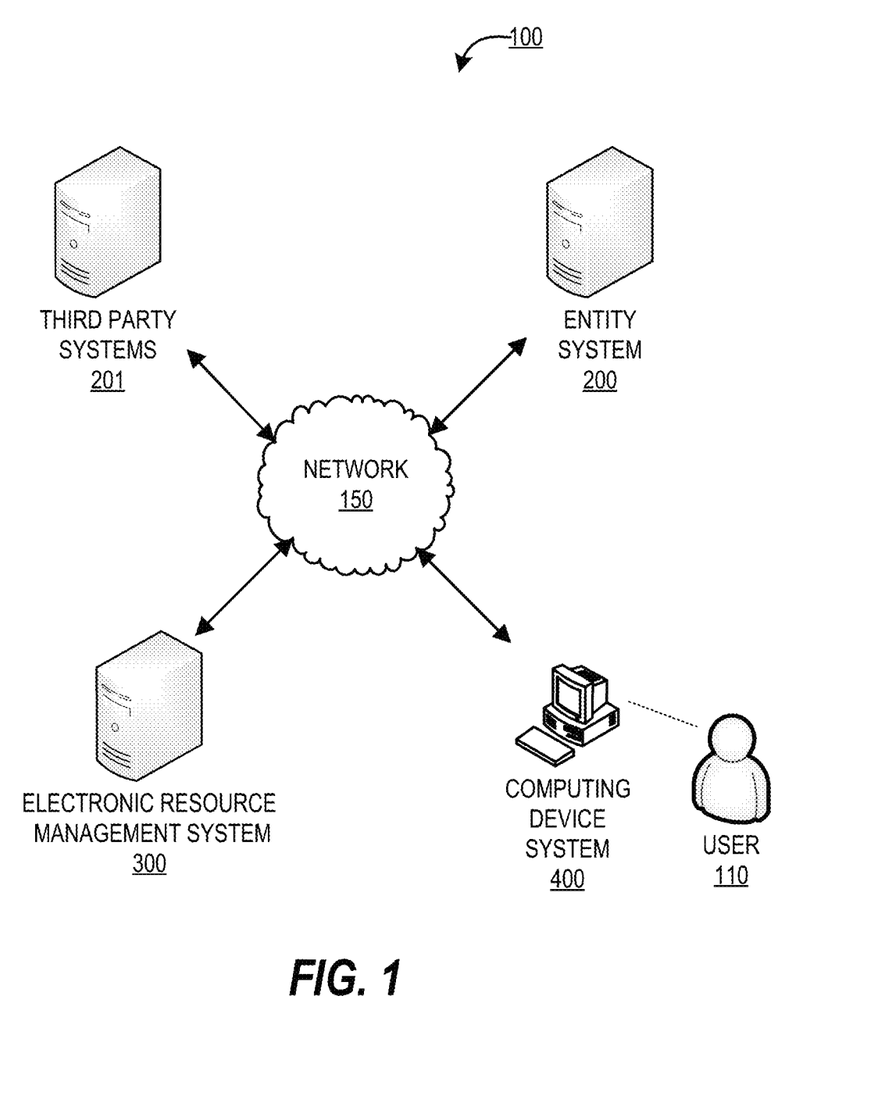
FIG. 1 provides a block diagram illustrating a system environment for creating and managing self-purgative resources, in accordance with an embodiment of the invention.

FIG. 1 provides a block diagram illustrating a system environment 100 for creating and managing self-purgative resources, in accordance with an embodiment of the invention. As illustrated in FIG. 1, the environment 100 includes an electronic resource management system 300, entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200.

The entity system(s) 200 may be any system owned or otherwise controlled by an entity to support or perform one or more process steps described herein. The entity may be any organization which develops or manages applications. In some embodiments, the managing entity is a financial institution. In some embodiments, the managing entity is a non-financial institution.

The electronic resource management system 300 is a system of the present invention for performing one or more process steps described herein. In some embodiments, the electronic resource management system 300 may be an independent system. In some embodiments, the electronic resource management system 300 may be a part of the entity system 200.

The electronic resource management system 300, the entity system 200, the computing device system 400, and/or the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the electronic resource management system 300 is configured to communicate information or instructions with the entity system 200, the computing device system 400, and/or the third party systems 201 across the network 150.

The computing device system 400 may be a system owned or controlled by the entity of the entity system 200, the user 110, and/or a third party that specializes in processing of the resource distribution applications in the system environment 100. As such, the computing device system 400 may be a computing device of the user 110. In general, the computing device system 400 communicates with the user 110 via a user interface of the computing device system 400, and in turn is configured to communicate information or instructions with the electronic resource management system 300, entity system 200, and/or the third party systems 201 across the network 150.

Figure 2:
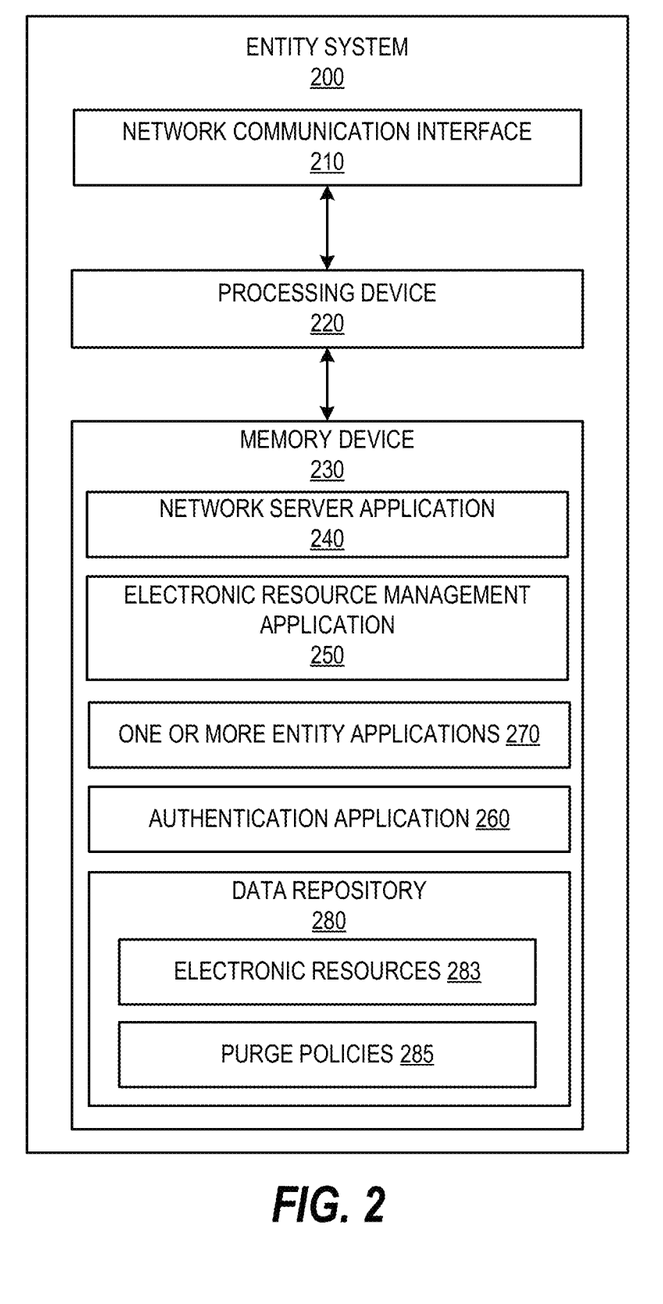
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, an electronic resource management application 250, one or more entity applications 270, an authentication application 260, and a data repository 280 comprising electronic resources 283 and purge policies 285. The computer-executable program code of the network server application 240, the electronic resource management application 250, the one or more entity applications 270, and the authentication application 260 to perform certain logic, data-extraction, and data-storing functions of the entity system 200 described herein, as well as communication functions of the entity system 200.

The network server application 240, the electronic resource management application 250, the one or more entity applications 270, and the authentication application 260 are configured to store data in the data repository 280 or to use the data stored in the data repository 280 when communicating through the network communication interface 210 with the electronic resource management system 300, the computing device system 400, and/or the third party systems 201 to perform one or more process steps described herein. In some embodiments, the entity system 200 may receive instructions from the electronic resource management system 300 via the electronic resource management application 250 to perform certain operations. The electronic resource management application 250 may be provided by the electronic resource management system 300. The one or more entity applications 270 may be any of the applications used, created, modified, and/or managed by the entity system 200. The authentication application 260 may be used to authenticate one or more users 110 to access the one or more entity applications 270 and the data repository 280. The electronic resources 283 may be any of the electronic documents associated with the entity system 200. The purge policies may be retention periods associated with the electronic resources 283.

Figure 3:
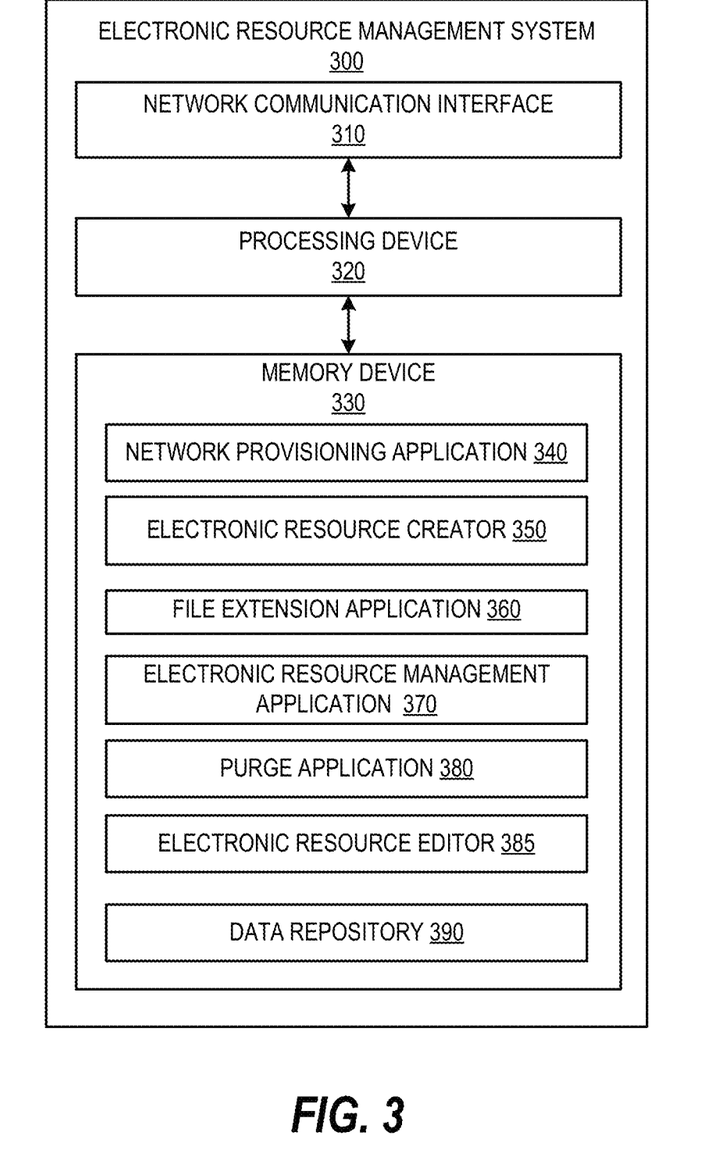
FIG. 3 provides a block diagram illustrating an electronic resource management system 300 of FIG. 1, in accordance with an embodiment of the invention.

FIG. 3 provides a block diagram illustrating the electronic resource management system 300 in greater detail, in accordance with embodiments of the invention. As illustrated in FIG. 3, in one embodiment of the invention, the electronic resource management system 300 includes one or more processing devices 320 operatively coupled to a network communication interface 310 and a memory device 330. In certain embodiments, the electronic resource management system 300 is operated by a first entity, such as a financial institution, while in other embodiments, the electronic resource management system 300 is operated by an entity other than a financial institution. In some embodiments, the electronic resource management system 300 is owned or operated by the entity of the entity system 200. In some embodiments, the electronic resource management system 300 may be an independent system. In alternate embodiments, the electronic resource management system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the electronic resource management system 300 described herein. For example, in one embodiment of the electronic resource management system 300, the memory device 330 includes, but is not limited to, a network provisioning application 340, a file extension application 360, an electronic resource management application 370, a purge application 380, an electronic resource editor 385, and a data repository 390 comprising data processed or accessed by one or more applications in the memory device 330. The computer-executable program code of the network provisioning application 340, the file extension application 360, the electronic resource management application 370, the purge application 380, and the electronic resource editor 385 may instruct the processing device 320 to perform certain logic, data-processing, and data-storing functions of the electronic resource management system 300 described herein, as well as communication functions of the electronic resource management system 300.

The network provisioning application 340, the file extension application 360, the electronic resource management application 370, the purge application 380, and the electronic resource editor 385 are configured to invoke or use the data in the data repository 390 when communicating through the network communication interface 310 with the entity system 200, the computing device system 400, and/or the third party systems 201. In some embodiments, the network provisioning application 340, the file extension application 360, the electronic resource management application 370, the purge application 380, and the electronic resource editor 385 may store the data extracted or received from the entity system 200, the third party system 201, and the computing device system 400 in the data repository 390. In some embodiments, the network provisioning application 340, the file extension application 360, the electronic resource management application 370, the purge application 380, and the electronic resource editor 385 may be a part of a single application.

In some embodiments, a data extraction/transfer application of the electronic resource management system 300 may extract or receive resource data from the entity system 200, the third party system 201, and the computing device system 400, via the network provisioning application 340. The electronic resource creator 350 may be used to create one or more electronic resources comprising purge policies embedded into each of the one or more electronic resources. In some embodiments, the electronic resource creator 350 may create the one or more electronic resources based on one or more triggers received from the one or more entity applications 270 of the entity system 200, via the electronic resource management application 250, the network server application 240, and the network provisioning application 340. In some embodiments, the one or more triggers may be received from computing device system 400 of the user 110. The file extension application 360 assigns unique extensions to the one or more electronic resources while saving the one or more electronic resources in the data repository 390 or the data repository 280. The electronic resource management application 370 identifies that a purge policy of at least one electronic resource is zero days and the purge application 380 makes the memory space associated with the electronic resource available for other electronic resources.

Figure 4:
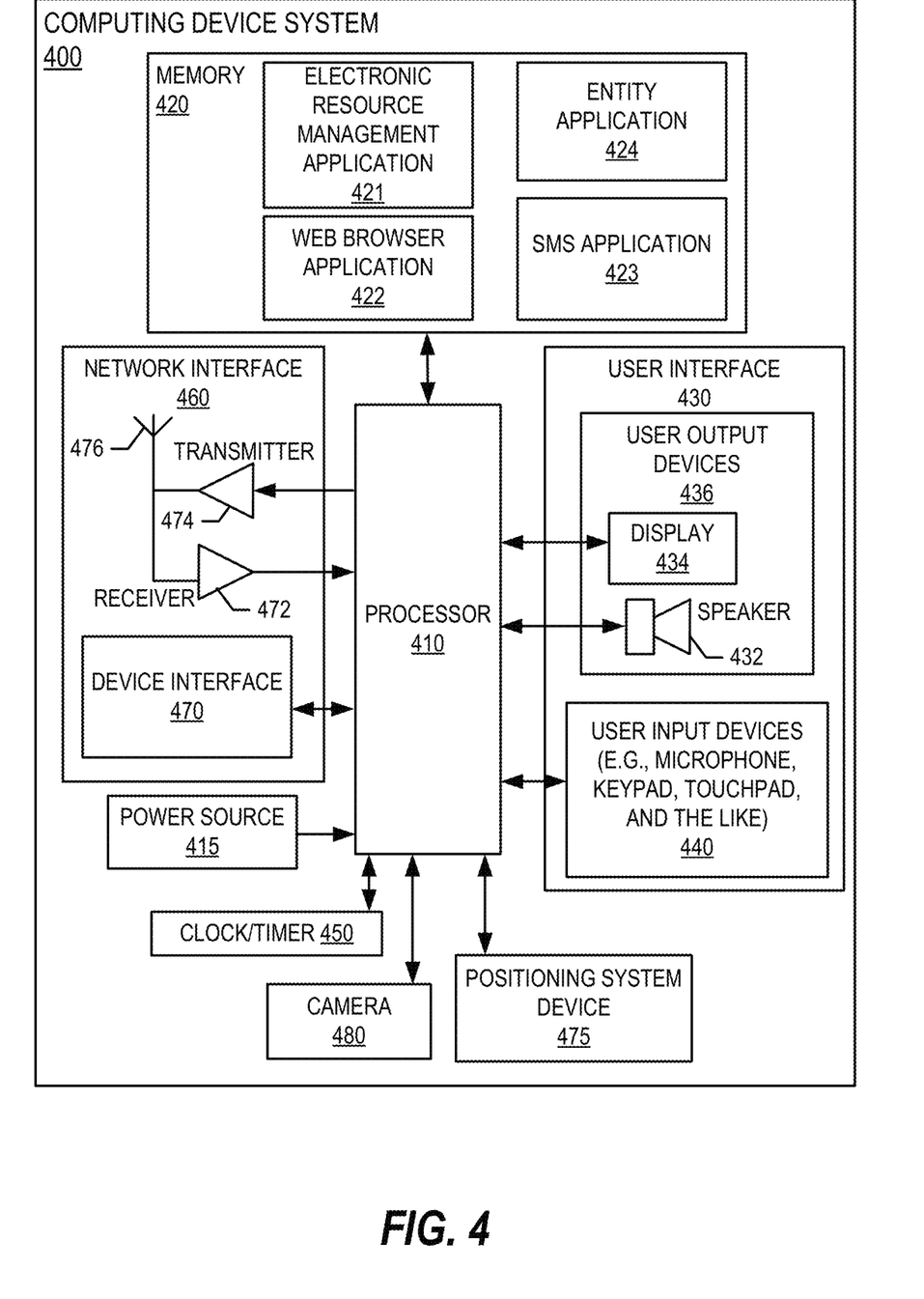
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, electronic resource management application 421, entity application 424. These applications also typically instructions to a graphical user interface (GUI) on the display 430 that allows the user 110 to interact with the entity system 200, the electronic resource management system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the electronic resource management application 421 provided by the electronic resource management system 300 allows the user 110 to access the one or more electronic resources stored in the entity system and/or the electronic resource management system 300. In some embodiments, the entity application 424 provided by the entity system 200 and the electronic resource management application 421 allow the user 110 to access one or more electronic resources and one or more entity applications 270.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5A:
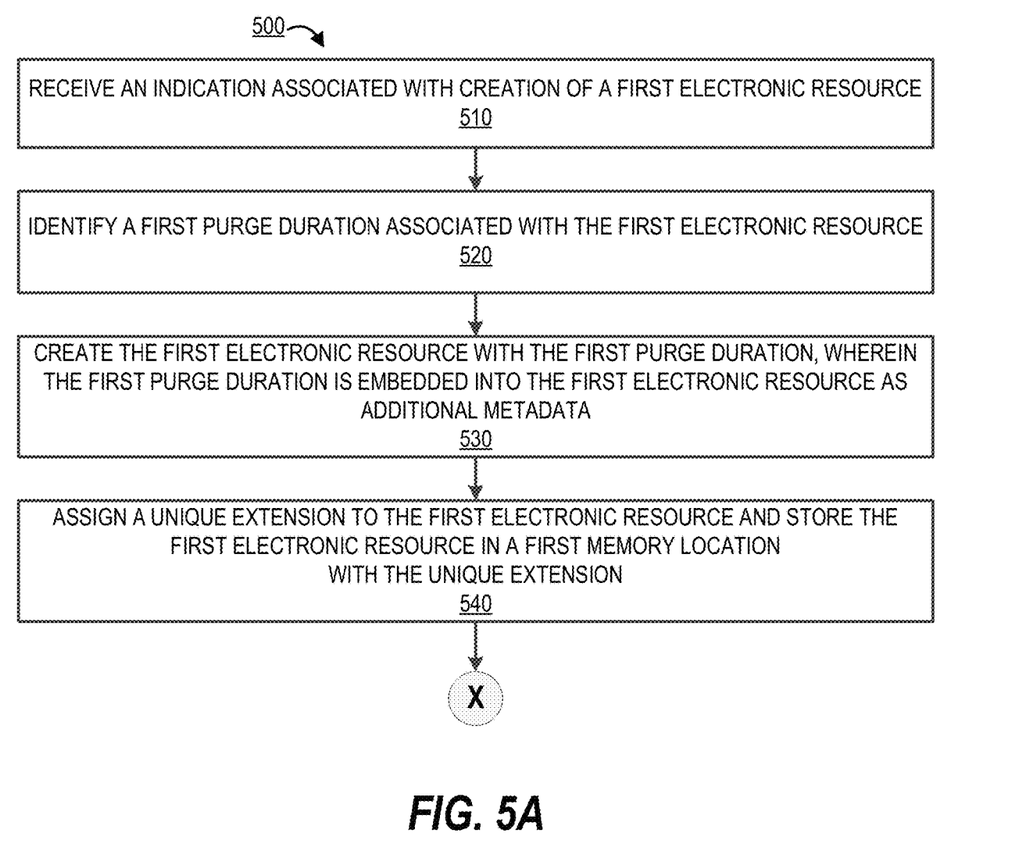
FIGS. 5A-5C provide a flowchart illustrating a process flow for creating and managing self-purgative electronic resources, in accordance with an embodiment of the invention.
Figure 5B:
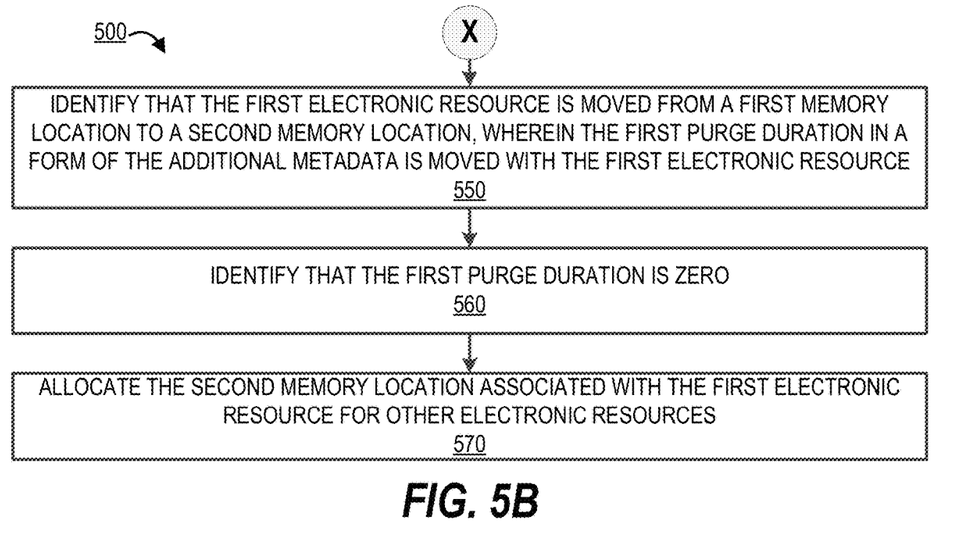
Figure 5C:
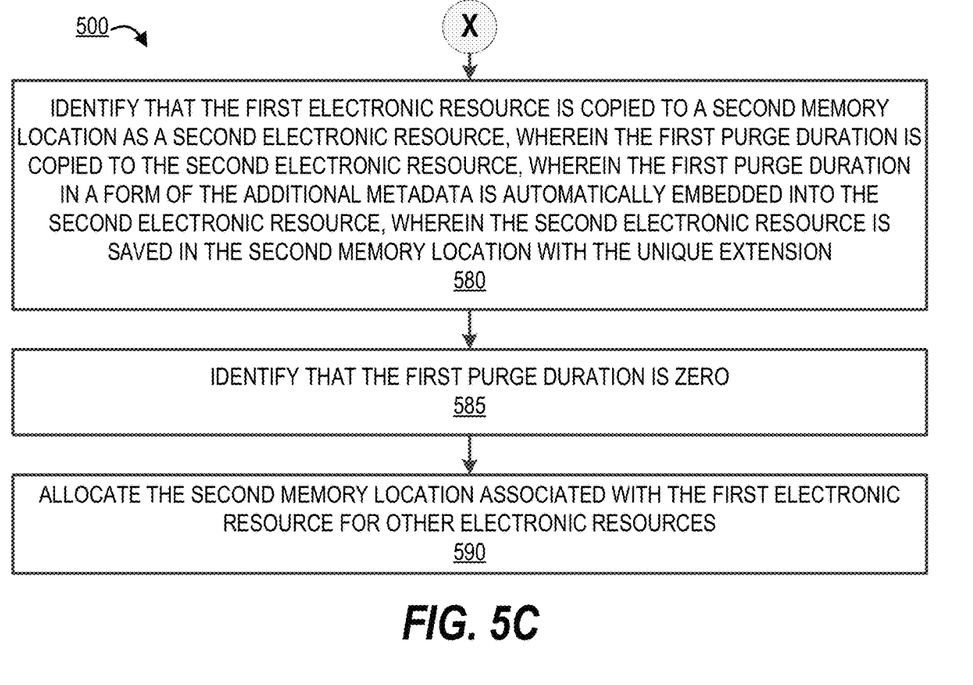

FIGS. 5A-5C provide a flowchart illustrating a process flow for creating and managing self-purgative electronic resources, in accordance with an embodiment of the invention. As shown in block 510, the system receives an indication associated with creation of a first electronic resource. The first electronic resource may be any document or file comprising data associated with the entity. In some embodiments, the indication is received from a user, where the user is an employee of an entity. In some embodiments, the indication is received from an entity application, where the entity application is used to perform one or more operations associated with the entity. For example, the electronic resource may be an application log comprising one or more tasks or operations performed by the entity application.

As shown in block 520, the system identifies a first purge duration associated with the first electronic resource. In some embodiments, the system automatically assigns the first purge duration to the first electronic resource. For example, the system may identify that the electronic resource that is being created is a daily application log and sets the purge duration as seven days. The system may identify the type of the electronic resource that is being created and may assign the purge duration to the electronic resource based on the identified type. The purge durations for different type of electronic resources may be present in an entity system or a third party system. The system of the present invention may extract the purge policy data from the entity system or the third party system. In some embodiments, the purge durations may be specific to each of the entity applications. For example, documents associated with entity application 'A' may have a purge policy of twelve months and documents associated with entity application 'B' may have a purge policy of one week. In some embodiments, the purge durations may be associated with the type of a document irrespective of the entity application. For example, an application log created by the entity application 'A' may have a purge policy of one week and a document associated with user information bundles created by the entity application 'A' may have a purge policy of ten years. In some embodiments, the purge duration may be based on historical data. In some other embodiments, the system may prompt a user to provide the purge duration related to the first electronic resource.

As shown in block 530, the system, in some embodiments, creates the first electronic resource with the first purge duration, wherein the first purge duration is embedded into the first electronic resource as additional metadata. In some embodiments, in addition to the embedding the first purge duration as additional metadata, the system may provide the metadata associated with the first electronic resource to an entity application. In some embodiments, the system may create a wrapper for the first electronic resource comprising the first purge duration. As such, whenever the first electronic resource is accessed by an entity system or a user computing system, the entity system and the user computing system may access the wrapper comprising the first purge duration along with the first electronic resource. In some embodiments, the wrapper may further comprise instructions for notifying the system upon the expiration of the first purge duration. In some embodiments, the system may create the first electronic resource and may place the first purge duration in a file name of the first electronic resource. In some embodiments, the system may create the first electronic resource and insert the first purge duration inside the first electronic resource as first few bytes of the first electronic resource. In some such embodiments, the system may place the first purge duration inside the file in a hidden format. In some embodiments, the system may use a combination of above steps for tagging the first purge duration to the first electronic resource. In some embodiments, the first electronic resource comprising the first purge duration may comprise additional instructions for notifying the system upon expiration of the first purge duration.

As shown in block 540, the system assigns a unique extension to the first electronic resource and store the first electronic resource in a first memory location. The unique extension allows the system, the entity systems, and the user computing systems to identify all electronic resources comprising purge duration embedded in the electronic documents. The unique extension may also allow the system, the entity systems, and the user computing systems to utilize the purge duration embedded inside the first electronic resource. In some embodiments, the unique extension may allow only a specific entity application to access such electronic resources, while remaining inaccessible to other entity applications.

FIG. 5B illustrates a specific embodiment of the process flow 500 associated with the creating and managing self-purgative electronic resources. As shown in block 550, the system identifies that the first electronic resource is moved from a first memory location to a second memory location, wherein the first purge duration in a form of the additional metadata is moved with the first electronic resource. The first purge duration may be inserted into the first electronic resource as discussed in different embodiments. In some embodiments, the first memory location may be associated with a first entity system and the second memory location may be associated with a second entity system. In some embodiments, the first memory location and the second memory location may be associated with a single entity system.

As shown in block 560, the system identifies that the first purge duration of the first electronic resource in the second memory location is zero. In some embodiments, the system may identify that the first purge duration is zero based on receiving a notification from the first electronic resource. The instructions embedded into the first electronic resource along with the first purge duration may notify the system after the first purge duration of the first electronic resources reaches zero.

As shown in block 570, the system, in some embodiments, allocates the second memory location associated with the first electronic resource for other electronic resources. In response to receiving the notification from the first electronic resource, the system identifies that the first purge duration of the first electronic resource is zero and makes the memory location available to be rewritten. As such, the first electronic resource is retained in the second memory location until the second memory location is occupied by another electronic resource. In some embodiments, the system in response to identifying that the first purge duration of the first electronic resource is zero, purges the first electronic resource.

FIG. 5C illustrates a specific embodiment of the process flow 500 associated with the creating and managing self-purgative electronic resources. As shown in block 580, the system identifies that the first electronic resource is copied to a second memory location as a second electronic resource, wherein the first purge duration is copied to the second electronic resource, wherein the first purge duration in a form of the additional metadata is automatically embedded into the second electronic resource, wherein the second electronic resource is saved in the second memory location with the unique extension. For example, if a document 'A' stored in a location 'A' comprising a purge duration of twelve months is copied to a location 'B' as document 'B,' the purge duration of twelve months associated with document 'A' will also be copied and applied to document 'B'. In some embodiments, the first memory location may be associated with a first entity system and the second memory location may be associated with a second entity system. In some embodiments, the first memory location and the second memory location may be associated with a single entity system.

As shown in block 585, the system identifies that the first purge duration associated with the second electronic resource is zero. As shown in block 590, the system allocates the second memory location associated with the first electronic resource for other electronic resources. In some embodiments, the system in response to identifying that the first purge duration of the second electronic resource is zero, purges the second electronic resource. At the same instance, the system may allocate the first memory location associated with first electronic resource for other electronic resources if the first purge duration associated with the first electronic resource is not altered.

In some embodiments, the system may allow a user to change purge durations associated with the electronic resources. In some embodiments, the system may allow an entity application to change the purge duration associated with the electronic resources based on user input. In some embodiments, the system automatically changes the purge durations of electronic resources based on the frequency of access and type of electronic resource. For example, if a first document is accessed ten times within a duration of one week, the system may automatically extend the purge duration of the first document. In another example, even if the first document is accessed ten times within a duration of one week and if the document is a daily log document, the system may not extend the purge duration of the first document.

In some embodiments, when a user accesses the first electronic resource, the system displays the first electronic resource and also displays the purge duration associated with the first electronic resource. In some such embodiments, the system also prompts the user to edit the first purge duration of the first electronic resource. In response to receiving an instruction from the user to modify the first purge date, the system modifies the first purge duration embedded into the first resource document. In some embodiments, the system may also have the ability to retrieve electronic resources that have been purged.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for creating and managing self-purgative electronic resources, the system comprising:
    at least one non-transitory storage device; and
    at least one processing device coupled to the at least one non-transitory storage device, wherein the at least one processing device is configured to:
        receive an indication associated with creation of a first electronic resource;
        identify a first purge duration associated with the first electronic resource;
        create the first electronic resource with the first purge duration, wherein the first purge duration embedded into the first electronic resource as additional metadata;
        assign a unique extension to the first electronic resource and store the first electronic resource in a first memory location with the unique extension;
        identify that the first electronic resource is copied to a second memory location as a second electronic resource, wherein the first purge duration is copied to the second electronic resource, wherein the first purge duration in a form of the additional metadata is automatically embedded into the second electronic resource, wherein the second electronic resource is saved in the second memory location with the unique extension;
        identify that the first purge duration is zero; and
        in response to identifying that the first purge duration is zero, allocate the second memory location associated with the second electronic resource to other electronic resources.

2. The system of claim 1, wherein the at least one processing device is further configured to:
    identify that the first purge duration is zero; and
    in response to identifying that the first purge duration is zero, allocate the first memory location associated with the first electronic resource to other electronic resources.

3. The system of claim 1, wherein the at least one processing device is further configured to:
    identify that the first electronic resource is moved from the first memory location to a third memory location, wherein the first purge duration in a form of the additional metadata is moved with the first electronic resource;
    identify that the first purge duration is zero; and
    in response to identifying that the first purge duration is zero, allocate the third memory location associated with the first electronic resource for other electronic resources.

4. The system of claim 1, wherein the at least one processing device is further configured to:
    receive an indication from a user to access the first electronic resource from a first computing device;
    display the first electronic resource on the first computing device; and
    in response to displaying the first electronic resource on the first computing device, display the first purge duration associated with the first electronic resource on the first computing device.

5. The system of claim 1, wherein the at least one processing device is further configured to:
    receive an instruction to modify the first purge duration from a user; and
    in response to receiving the instruction, modify the first purge duration of the first electronic resource.

6. The system of claim 1, wherein the at least one processing device is further configured to automatically modify the first purge duration of the first electronic resource, wherein the modifying is based on identifying that the first electronic resource has been accessed by a user.

7. The system of claim 1, wherein the first electronic resource is associated with an application associated with an entity, wherein the first electronic resource is automatically created by the application.

8. A computer program product for creating and managing self-purgative electronic resources, the computer program product comprising a non-transitory computer-readable storage medium having computer executable instructions for causing a computer processor to perform the steps of:
receiving an indication associated with creation of a first electronic resource;
identifying a first purge duration associated with the first electronic resource;
creating the first electronic resource with the first purge duration, wherein the first purge duration embedded into the first electronic resource as additional metadata;
assigning a unique extension to the first electronic resource and storing the first electronic resource in a first memory location;
identifying that the first electronic resource is copied to a second memory location as a second electronic resource, wherein the first purge duration is copied to the second electronic resource, wherein the first purge duration in a form of the additional metadata is automatically embedded into the second electronic resource, wherein the second electronic resource is saved in the second memory location with the unique extension;
identifying that the first purge duration is zero; and
in response to identifying that the first purge duration is zero, allocating the second memory location associated with the second electronic resource to other electronic resources.

9. The computer program product of claim 8, wherein the computer executable instructions further cause the computer processor to:
identify that the first purge duration is zero; and
in response to identifying that the first purge duration is zero, allocate the first memory location associated with the first electronic resource to other electronic resources.

10. The computer program product of claim 8, wherein the computer executable instructions further cause the computer processor to:
identify that the first electronic resource is moved from the first memory location to a third memory location, wherein the first purge duration in a form of the additional metadata is moved with the first electronic resource;
identify that the first purge duration is zero; and
in response to identifying that the first purge duration is zero, allocate the third memory location associated with the first electronic resource for other electronic resources.

11. The computer program product of claim 8, wherein the computer executable instructions further cause the computer processor to:
receive an indication from a user to access the first electronic resource from a first computing device;
display the first electronic resource on the first computing device; and
in response to displaying the first electronic resource on the first computing device, display the first purge duration associated with the first electronic resource on the first computing device.

12. The computer program product of claim 8, wherein the computer executable instructions further cause the computer processor to:
receive an instruction to modify the first purge duration from a user; and
in response to receiving the instruction, modify the first purge duration of the first electronic resource.

13. The computer program product of claim 8, wherein the computer executable instructions further cause the computer processor to automatically modify the first purge duration of the first electronic resource, wherein the modifying is based on identifying that the first electronic resource has been accessed by a user.

14. A computerized method for creating and managing self-purgative electronic resources, the method comprising:
receiving an indication associated with creation of a first electronic resource;
identifying a first purge duration associated with the first electronic resource;
creating the first electronic resource with the first purge duration, wherein the first purge duration embedded into the first electronic resource as additional metadata;
assigning a unique extension to the first electronic resource and storing the first electronic resource in a first memory location with the unique extension;
identifying that the first electronic resource is copied to a second memory location as a second electronic resource, wherein the first purge duration is copied to the second electronic resource, wherein the first purge duration in a form of the additional metadata is automatically embedded into the second electronic resource, wherein the second electronic resource is saved in the second memory location with the unique extension;
identifying that the first purge duration is zero; and
in response to identifying that the first purge duration is zero, allocating the second memory location associated with the second electronic resource to other electronic resources.

15. The computerized method of claim 14, wherein the method further comprises:
identifying that the first purge duration is zero; and
in response to identifying that the first purge duration is zero, allocating the first memory location associated with the first electronic resource to other electronic resources.

16. The computerized method of claim 14, wherein the method further comprises:
identifying that the first electronic resource is moved from first memory location to a third memory location, wherein the first purge duration in a form of the additional metadata is moved with the first electronic resource;
identifying that the first purge duration is zero; and
in response to identifying that the first purge duration is zero, allocating the third memory location associated with the first electronic resource for other electronic resources.

17. The computerized method of claim 14, wherein the method further comprises:
receiving an indication from a user to access the first electronic resource from a first computing device;
displaying the first electronic resource on the first computing device; and in response to displaying the first electronic resource on the first computing device, displaying the first purge duration associated with the first electronic resource on the first computing device.

18. The computerized method of claim 14, wherein the method further comprises:
receiving an instruction to modify the first purge duration from a user; and
in response to receiving the instruction, modifying the first purge duration of the first electronic resource.

19. The computerized method of claim 14, wherein the method further comprises automatically modifying the first purge duration of the first electronic resource, wherein the modifying is based on identifying that the first electronic resource has been accessed by a user.

20. The computerized method of claim 14, wherein the first electronic resource is associated with an application associated with an entity, wherein the first electronic resource is automatically created by the application.

\* \* \* \* \*